US012478618B1

(12) United States Patent
Williams

(10) Patent No.: US 12,478,618 B1
(45) Date of Patent: *Nov. 25, 2025

(54) USE OF GLUTAMATE 2B RECEPTOR ANTAGONISTS AND SIGMA RECEPTOR AGONISTS AS ANTITUSSIVES

(71) Applicant: Seyltx, Inc., Pittsburgh, PA (US)

(72) Inventor: Mark Williams, Winnipeg (CA)

(73) Assignee: Seyltx, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/811,355

(22) Filed: Aug. 21, 2024

Related U.S. Application Data

(63) Continuation of application No. 17/771,664, filed as application No. PCT/CA2020/050306 on Mar. 6, 2020.

(60) Provisional application No. 62/943,537, filed on Dec. 4, 2019, provisional application No. 62/926,871, filed on Oct. 28, 2019.

(51) Int. Cl.
 *A61K 31/445* (2006.01)
 *A61K 31/454* (2006.01)
 *A61P 11/14* (2006.01)

(52) U.S. Cl.
 CPC .......... *A61K 31/445* (2013.01); *A61K 31/454* (2013.01); *A61P 11/14* (2018.01)

(58) Field of Classification Search
 None
 See application file for complete search history.

(56) References Cited

U.S. PATENT DOCUMENTS

| | | | |
|---|---|---|---|
| 7,547,715 | B2 | 6/2009 | Sakai et al. |
| 7,858,650 | B2 | 12/2010 | Yamamoto et al. |
| 2005/0222205 | A1 | 10/2005 | Brew et al. |
| 2008/0268014 | A1 | 10/2008 | Garvey et al. |
| 2015/0272874 | A1 | 10/2015 | Sawa et al. |
| 2018/0215699 | A1 | 8/2018 | Humbert et al. |
| 2018/0235931 | A1 | 8/2018 | Basta et al. |
| 2022/0117951 | A1 | 4/2022 | Williams |
| 2022/0378769 | A1 | 12/2022 | Williams |

FOREIGN PATENT DOCUMENTS

| | | |
|---|---|---|
| CA | 2938928 A1 | 8/2015 |
| CN | 110251677 A | 9/2019 |
| GB | 2430434 A | 3/2007 |
| WO | WO-2012020270 A1 | 2/2012 |
| WO | WO-2014069401 A1 | 5/2014 |
| WO | WO-2015171770 A1 | 11/2015 |
| WO | WO-2018136554 A1 | 7/2018 |
| WO | WO-2020163966 A1 | 8/2020 |

OTHER PUBLICATIONS

Mann et al. "Cough in Idiopathic Pulmonary Fibrosis". Frontiers in Rehabilitation Sciences. 2021; 2:751798. (Year: 2021).*
Van Manen et al. "Cough in Idiopathic Pulmonary Fibrosis". European Respiratory Review. 2016; 25(141):278-286. (Year: 2016).*
Akwe, J. Pulmonary Effects of Cocaine Use. Journal of Lung, Pulmonary & Respiratory Research. vol. 4, Issue 2, 6 pages (2017).
Anderson, Sandra. et al. Inhaled Medicines: Past, Present, and Future. Pharmacological Reviews 74(1):48-118 (2022).
Brightling, Christopher E. Chronic Cough Due to Nonasthmatic Eosinophilic Bronchitis: ACCP Evidence-based Clinical Practice Guidelines. Chest 129(1):116S-121S (2006).
Canning, Brendan J. Central Regulation of the Cough Reflex: Therapeutic Implications. Pulmonary Pharmacology & Therapeutics 22(2):75-81 (2009).
Chemical Abstracts Service. CAS Registry No. 808732-98-1. Rislenemdaz. STN Entry Date Oct. 26, 2006.
Citalopram FDA Label, Reference ID:4933291, 25 pages, Initial U.S. Approval 1998.
Deidda, A. et al. Interstitial lung disease induced by fluoxetine: Systematic review of literature and analysis of Vigiaccess, Eudravigilance and a national pharmacovigilance database, Science Direct Pharmacological Research, vol. 120, 294-301 (2017).
Dere, E. et al. NMDA-Receptor Antagonism Via Dextromethorphan And Ifenprodil Modulates Graded Anxiety Test Performance Of C57BL/6 Mice. Behavioural Pharmacology 14(3):245-249 (2003).
Dicpinigaitis, P. et al. Effect of Memantine on Cough Reflex Sensitivity: Translational Studies in Guinea Pigs and Humans. J Pharmacol Exp Ther 352:448-454 (2015).
EP20200754897.5 European Search Report dated Mar. 22, 2022.
EP20882816.0 Extended European Search Report dated Jan. 30, 2024.
Escitalopram FDA Label, Reference ID:4036381, 26 pages, Initial U.S. Approval 2002.
Fluvoxamine FDA Label, Reference ID: 3223798, 35 pages, Initial U.S. approval 1994.
Hashimoto, Kenji. Activation Of Sigma-1 Receptor Chaperone In The Treatment Of Neuropsychiatric Diseases And Its Clinical Implication. Journal of Pharmacological Sciences 127(1):6-9 (2015).
Kocsis, B. Differentials role of NR2A and NR2B subunits in NMDA receptor antagonist-induced aberrant cortical gamma oscillations. Biol Psychiatry. 71(11): 985-995 (2012).
Lamotrigine FDA Label, Reference ID: 4771201, 70 pages, Initial U.S. Approval 1994.
Leonard, B. Sigma receptors and sigma ligands: background to a pharmacological enigma. Pharmacopsychiatry. 37 Suppl 3:S166-70. (2004)—Abstract Only.
Lever, John R. et al. Characterization Of Pulmonary Sigma Receptors By Radioligand Binding. European Journal of Pharmacology 762:118-126 (2015).
Li, Yang, et al. NMDA Receptor Antagonist Attenuates Bleomycin-induced Acute Lung Injury. PLoS One 10(5):e0125873, 1-14 (2015).
Mouratis, Marios A, and Vassilis Aidinis. Modeling pulmonary fibrosis with bleomycin. Current opinion in pulmonary medicine 17(5): 355-361 (2011).

(Continued)

*Primary Examiner* — Leslie A. Royds Draper
(74) *Attorney, Agent, or Firm* — WILSON SONSINI GOODRICH & ROSATI

(57) ABSTRACT

The use of glutamate 2b receptor antagonists and sigma receptor agonists as antitussives to treat or prevent a cough is disclosed. In preferred embodiments, the glutamate 2b receptor antagonist is ifenprodil or radiprodil. Preferred sigma receptor agonists include fluvoxamine, fluoxetine, excitalpram, and donepezil.

20 Claims, 4 Drawing Sheets

(56) References Cited

OTHER PUBLICATIONS

Nair, Anroop B. et al. A Simple Practice Guide for Dose Conversion Between Animals and Human. Journal of Basic and Clinical Pharmacy 7(2):27-31 (2016).
Nakanishi, Yuki et al. 03F-28-4: Modulations Of Cough Reflex Sensitivity Through Airway NMDA Receptor. Journal of Pharmacological Sciences 121:112, p. 1 (2013).
Nguyen, Linda. et al. Dextromethorphan: An Update On Its Utility For Neurological And Neuropsychiatric Disorders. Pharmacology & Therapeutics 159:1-22 (2016).
Oh, S. et al. Dextromethorphan. StatPearls NCBI Bookshelf, pp. 6 (2023).
Ohi, Y. et al. Dextromethorphan Inhibits the Glutamatergic Synaptic Transmission in the Nucleus Tractus Solitarius of Guinea Pigs. J Pharmacol Sci 116, 54-62 (2011).
PCT/CA2020/050199 International Preliminary Report on Patentability dated Aug. 10, 2021.
PCT/CA2020/050199 International Search Report and Written Opinion dated Apr. 27, 2020.
PCT/CA2020/050306 International Preliminary Report on Patentability dated May 3, 2022.
PCT/CA2020/050306 International Search Report and Written Opinion dated Jun. 23, 2020.
Rashid, Jahidur. et al. Repurposing Rosiglitazone, A PPAR-γ Agonist And Oral Antidiabetic, As An Inhaled Formulation, For The Treatment Of PAH. Journal of Controlled Release 280:113-123 (2018).
Reagan-Shaw, Shannon. et al. Dose Translation From Animal to Human Studies Revisited. The Faseb Journal 22(3):659-661 (2008).
Ruppa, Kamalesh B. et al. Chapter 7: NMDA Antagonists of GluN2B Subtype and Modulators of GluN2A, GluN2C, and GluN2D Subtypes—Recent Results and Developments. Annual Reports in Medicinal Chemistry 47:89-103 (2012).
Smith, J. The therapeutic landscape in chronic cough. Lung 202:5-16 (2024).
U.S. Appl. No. 17/424,070 Office Action dated Jun. 14, 2024.
U.S. Appl. No. 17/771,664 Office Action dated Sep. 6, 2024.
U.S. Appl. No. 17/771,664 Restriction Requirement dated Jun. 25, 2024.
Wei, Y. et al. Different FDG-PET metabolic patterns of anti-AMPAR and anti-NMDAR encephalitis: Case report and literature review. Brain and Behavior 11 pages (2020).
Abdulqawi, Rayid, et al. An open-label study of the tolerability and potential efficacy of memantine for treating refractory chronic cough. ERJ Open Research 7.3 (2021).
Belvisi, Maria G. Summary: animal models for cough. Pulm. Pharmacol. Ther. 15: 249-250. (2002).
Bryan, Christopher. Algernon Pharmaceuticals: An update on NP-120 (ifenprodil): A subunit-selective NMDA receptor antagonist for the treatment of cough, American Cough Conference. pp. 1-23. (2023).
Callaway, J. K., et al. Evidence for peripheral mechanisms mediating the antitussive actions of opioids in the guinea pig. General Pharmacology: The Vascular System 22.6: 1103-1108. (1991).
Canning, Brendan J., et al. Encoding of the cough reflex in anesthetized guinea pigs. Am J Physiol Regul Integr Comp Physiol 300: R369-R377. (2011).
Chen, Liyan, et al. Detection of mouse cough based on sound monitoring and respiratory airflow waveforms. PloS one 8.3: e59263. (2013).
Chou, Yang-Ling, et al. Central vs. peripheral sites of action of antitussive agents in anesthetized guinea pigs. The FASEB Journal 23: 1011-3. (2009).
Chung, Kian Fan, et al. Cough hypersensitivity and chronic cough. Nature Reviews Disease Primers 8.1: 45. (2022).
Cotton, Imelda. Algernon Pharmaceuticals to present findings of Ifenprodil study for treatment of idiopathic pulmonary fibrosis. Small Caps. Retrieved from: https://smallcaps.ca/agernon-pharmaceuticals-present-findings-ifenprodil-study-treatment-idiopathic-pulmonary-fibrosis/ on Apr. 17, 2024. pp. 1-3. (2022).
Dicpinigaitis, Peter V., et al. Effect of Memantine on Cough Reflex Sensitivity: Translational Studies in Guinea Pigs and Humans. The Journal of Pharmacology and Experimental Therapeutics, 352: pp. 448-454. (2015).
Globe Newswire. Algernon Pharmaceuticals to present Phase 2 Ifenprodil Cough Data at the 2023 American Cough Conference. pp. 1-6. (2023).
Grattan, T. J., et al. The effect of inhaled and oral dextromethorphan on citric acid induced cough in man. British journal of clinical pharmacology 39.3: 261-263. (1995).
Inacio, Patricia. NP-120 (ifenprodil) Eases Cough in IPF Patients, Analysis Shows. Pulmonary Fibrosis News. Retrieved from: https://pulmonaryfibrosisnews.com/news/np-120-ifenprodil-eases-cough-ipf-patients-analysis-shows/ on Apr. 17, 2024. pp. 1-8. (2022).
Kocsis, Bernat. Differential role of NR2A and NR2B subunits in NMDA receptor antagonist-induced aberrant cortical gamma oscillations. Biol. Psychiatry, 71(11): pp. 987-995. (2012).
Mann, Jennifer, et al. Cough in idiopathic pulmonary fibrosis. Frontiers in Rehabilitation Sciences 2: 751798. (2021).
Martin Nguyen, Allison, et al. Validation of a visual analog scale for assessing cough severity in patients with chronic cough. Therapeutic advances in respiratory disease 15, 17534666211049743. (2021).
Martinez, Fernando J., et al. Treatment of persistent cough in subjects with idiopathic pulmonary fibrosis (IPF) with gefapixant, a P2X3 antagonist, in a randomized, placebo-controlled clinical trial. Pulmonary therapy 7.2: 471-486. (2021).
Mazzone, Stuart B., et al. Vagal afferent innervation of the airways in health and disease. Physiological reviews 96.3: 975-1024. (2016).
Moe, Aung Aung Kywe, et al. Brainstem processing of cough sensory inputs in chronic cough hypersensitivity. EBioMedicine 100. pp. 1-15. (2024).
Shapiro, Lindsey. NP-120's Efficacy for IPF Supported by Full Phase 2a Trial Data Analyses. Retrieved from: https://pulmonaryfibrosisnews.com/news/np-120-efficacy-supported-full-phase-2a-trial-data-algernon/ on Apr. 17, 2024. pp. 1-8. (2022).
Smith, Jaclyn A., et al. Antitussive effects of memantine in guinea pigs. Chest 141.4: 996-1002. (2012).
Smith, Jaclyn A. The therapeutic landscape in chronic cough. Lung 202.1: 5-16. (2024).
Wang, Jingya, et al. Distinct and common expression of receptors for inflammatory mediators in vagal nodose versus jugular capsaicin-sensitive/TRPV1-positive neurons detected by low input RNA sequencing. PloS one 12.10: e0185985. (2017).
Wei, Yi-Chia, et al. Different FDG-PET metabolic patterns of anti-AMPAR and anti-NMDAR encephalitis: case report and literature review. Brain and behavior 10.3: e01540. (2020).
Zhang, Cheng, et al. Cough and expiration reflexes elicited by inhaled irritant gases are intensified in ovalbumin-sensitized mice. American Journal of Physiology-Regulatory, Integrative and Comparative Physiology 312.5: R718-R726. (2017).
Avenet, Patrick. et al. Antagonist Properties of the Stereoisomers of Ifenprodil at NR1A/NR2A and NR1A/NR2B Subtypes of the NMDA Receptor Expressed in Xenopus Oocytes. European Journal of Pharmacology 296(2):209-213 (1996).
U.S. Appl. No. 17/424,070 Office Action dated Dec. 30, 2024.
U.S. Appl. No. 17/771,664 Office Action dated Jan. 21, 2025.
U.S. Appl. No. 17/771,664 Office Action dated Mar. 14, 2025.

* cited by examiner

USE OF GLUTAMATE 2B RECEPTOR ANTAGONISTS AND SIGMA RECEPTOR AGONISTS AS ANTITUSSIVES

CROSS-REFERENCE

This application is a continuation application of U.S. application Ser. No. 17/771,664, filed Apr. 25, 2022, which is a National Stage entry of PCT Application No. PCT/CA2020/050306, filed Mar. 6, 2020, which claims the benefit of U.S. Provisional Patent Application Nos. 62/926,871, filed Oct. 28, 2019, and 62/943,537, filed Dec. 4, 2019, each of which is incorporated herein by reference in their entirety.

FIELD OF INVENTION

The present invention relates to the use of compounds for treating a cough, and in particular, the use of glutamate 2b receptor antagonists such as Ifenprodil and Radiprodil for treating a cough.

BACKGROUND

A cough, also referred to as tussis, is a sudden, protective expulsion of air from the lungs that is usually accompanied by a sound. Coughing can be irregular, such as when it occurs to help clear the breathing passages from fluids, irritants, such as air pollution, and/or foreign particles. However, coughing can become repetitive and frequent, which may indicate the presence of a disease, such as a respiratory tract infection or mild bronchitis. Coughing may also be chronic, lasting over several weeks, which may be associated with a more serious underlying medical condition, such as asthma, gastroesophageal reflux disease, non-asthmatic eosinophilic bronchitis, and upper-airway cough syndrome.

A chronic (Persistent) cough is a cough lasting eight weeks or longer in adults, or four weeks in children. Chronic cough can interrupt sleep, cause exhaustion and in severe cases can cause serious vomiting, light-headedness and rib fractures.

A dry, non-productive cough is a very common symptom of IPF. At least 70%-85% of patients with IPF have a dry cough, which can often get worse on exertion.

According to a recent report from Research and Markets, in the United States, cough is the most common complaint for which patients seek medical attention and is the second most common reason for a general medical examination, accounting for more than 26 million office visits annually.

There is currently no known cure for the cough. Conventional treatments tend to focus on easing the symptoms. Such treatment includes home remedies, such as drinking fluids with honey, over-the-counter expectorant medication, and cough suppressants.

The present invention provides a novel use of existing drugs, typically studied and used as potential therapies for other pathologies, for the treatment and/or alleviation of a cough.

SUMMARY OF INVENTION

In an embodiment of the invention, a glutamate 2b receptor (Glut2B or GluN2B) antagonist for the treatment or prophylaxis of a cough in a subject. The Glut2B antagonist may be one or more of Ifenprodil, Radiprodil, Traxoprodil, Rislenmdaz, Eliprodil, Ro-25-6981, and BMT-108908, EVT-101, CP101-606, MK-0657, EVT-103, and AZD 6765 (Annual Reports in Medicinal Chemistry (2012) Volume 47:94-103).

BRIEF DESCRIPTION OF THE FIGURES

Exemplary embodiments are illustrated in referenced figures of the drawings. It is intended that the embodiments and figures disclosed herein are to be considered illustrative rather than restrictive.

DETAILED DESCRIPTION

Figure 1:
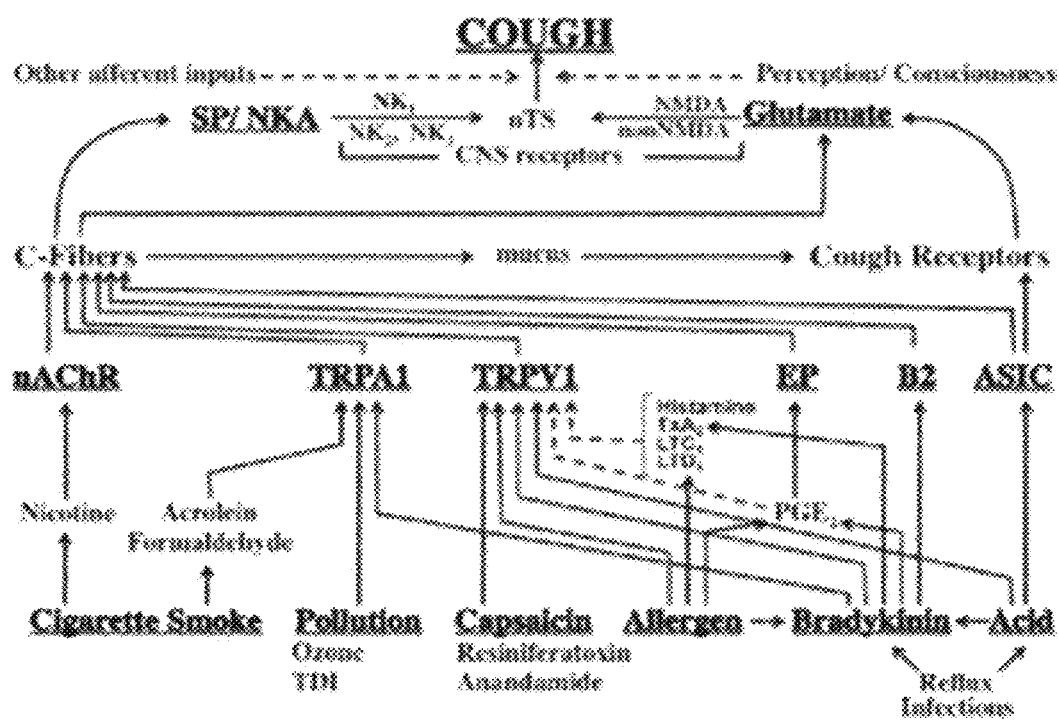
FIG. 1 is a schematic showing causation and central nervous system receptors and glutamate 2b receptor antagonist relationship with cough.
Figure 2:
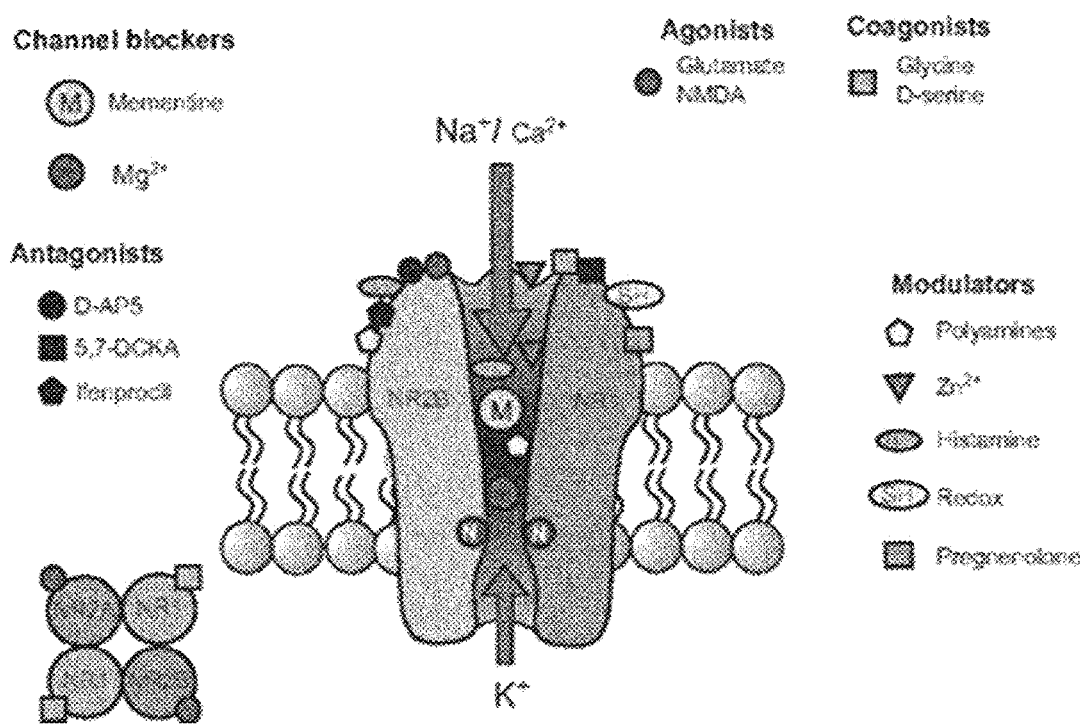
FIG. 2 is a schematic showing ion channel, receptors and glutamate 2b receptor antagonists relationships.

The inventor has found certain pharmacologic compounds, approved for use in other pathologies, are useful in the prophylaxis and/or treatment of a cough.

Based on the description herein, it is shown that the compounds described are useful in the prophylaxis and/or treatment of a cough. An anti-tussive effect was found when the compounds described herein were given to histamine exposed conscious guinea pigs with citric acid.

One currently used therapy for alleviating cough symptoms is administering the pharmacologic compound Gefapixant, which was used as a positive control in the experimental examples described herein.

Gefapixant, $C_{14}H_{19}N_5O_4S$, is a non-narcotic, selective antagonist of the P2X3 receptor. Recent studies have demonstrated that its application may have some efficacy in patients with chronic cough. Further trials are being conducted to further evaluate the efficacy and safety of Gefapixant in the control of cough in patients with chronic cough. The chemical structure of Gefapixant is:

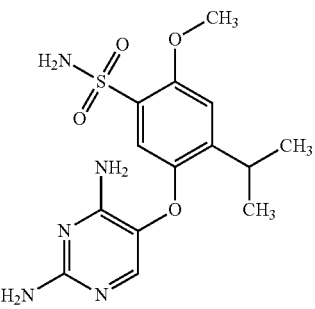 [SMILES: COc1cc(C(C)C)c(Oc2cnc(N)nc2N)cc1S(N)(=O)=O]

The present specification shows the effects of inhibiting or alleviating a cough by administering a therapeutically effective amount of Ifenprodil, Radiprodil, and other glutamate 2b receptor antagonists. These compounds described herein are existing drugs, typically known for treatment of non-pulmonary related conditions.

The rational behind their efficacy in alleviating or preventing coughing includes the fact that the glutamate receptor and sigma receptor 1 are targets of the above noted compounds. As well, Memantine, a non-specific NMDA inhibitor, has also shown preclinical and clinical efficacy.

Use of Ifenprodil

Ifenprodil, 4-[2-(4-benzylpiperidin-1-ium-1-yl)-1-hydroxypropyl]phenol; 2,3,4-trihydroxy-4-oxobutanoate, is known in the art as a selective is an N-methyl-d-aspartate (NMDA) receptor glutamate receptor antagonist specifically targeting the NMDA-type subunit 2B (Glu2NB). Ifenprodil also exhibits agonist activity for the Sigma-1 receptor, a chaperone protein up-regulated during endoplasmic reticulum stress. Ifenprodil was originally (in the early 1970's) developed as a vasodilator. Ifenprodil is currently being studied for treatment of adolescent PTSD. The chemical structure is:

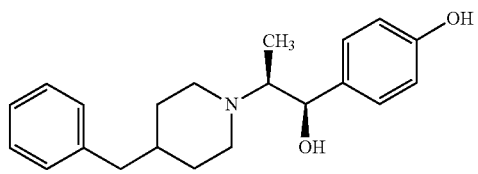 [SMILES: C[C@@H]([C@H](O)c1ccc(O)cc1)N1CCC(Cc2ccccc2)CC1]

In some embodiments tested in the examples herein, Ifenprodil hemitartrate having the following structure was used:

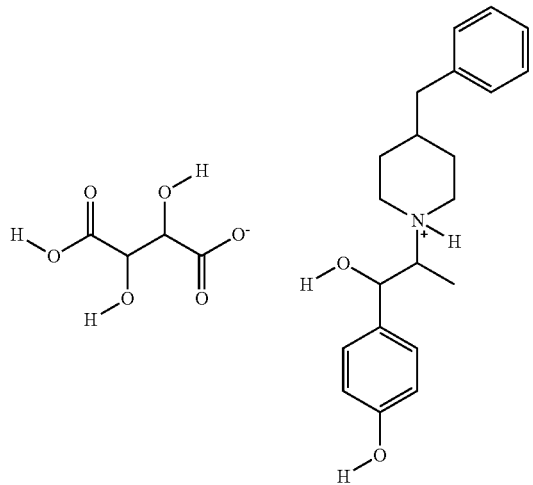 [SMILES: O=C([O-])C(O)C(O)C(=O)O ; CC(C(O)c1ccc(O)cc1)[NH+]1CCC(Cc2ccccc2)CC1]

In one aspect, the present invention provides a use and method of treatment or prophylaxis of a cough in a subject with Ifenprodil or a pharmaceutically acceptable variation thereof.

In an embodiment, the amount of Ifenprodil used is between 0.6 and 5 mg per kg of the subject per day. In a preferred embodiment, the amount of Ifenprodil used is between 0.8 to 3 mg per kg of the subject per day. In a further preferred embodiment, the amount of Ifenprodil used is about 1.5 mg per kg of the subject per day.

The Ifenprodil, or pharmaceutically acceptable variation thereof, may be administered to the subject orally, intravenously or in a manner known in the art. The Ifenprodil, or pharmaceutically acceptable variation thereof, may also be administered with one or more pharmaceutically acceptable excipients.

Use of Radiprodil

Radiprodil, 2-[4-[(4-fluorophenyl)methyl]piperidin-1-yl]-2-oxo-N-(2-oxo-3H-1,3-benzoxazol-6-yl) acetamide, is known in the art as an NMDA receptor antagonist. It has been used in trials studying the treatment of Infantile Spasms (IS) and Diabetic Peripheral Neuropathic Pain. The chemical structure of Radiprodil is:

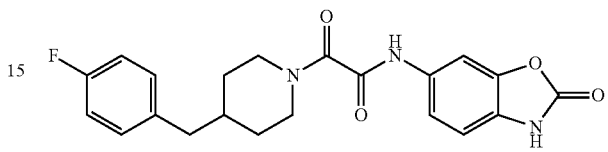

In one aspect, the present invention provides a use and method of treatment or prophylaxis of a cough in a subject with Radiprodil or a pharmaceutically acceptable variation thereof.

In an embodiment, the amount of Radiprodil used is between 1.6 and 3.3 mg per kg of the subject per day. In a preferred embodiment, the amount of Radiprodil used is about 2.5 mg per kg of the subject per day. In a further preferred embodiment, the amount of Radiprodil used is about 2.25 mg per kg of the subject par day.

The Radiprodil, or pharmaceutically acceptable variation thereof, may be administered to the subject orally, intravenously or in a manner known in the art. The Radiprodil, or pharmaceutically acceptable variation thereof, may also be administered with one or more pharmaceutically acceptable excipients.

Use of Glutamate 2b Receptor Antagonists

In an embodiment of the invention, a glutamate 2b receptor (Glut2B or GluN2B) antagonist for the treatment or prophylaxis of a cough in a subject. The Glut2B antagonist may be one or more of Ifenprodil, Radiprodil, Traxoprodil, Rislenmdaz, Eliprodil, Ro-25-6981, and BMT-108908, EVT-101, CP101-606, MK-0657, EVT-103, and AZD 6765 (Annual Reports in Medicinal Chemistry (2012) Volume 47:94-103).

In another aspect of the invention, ifenprodil is a known to exhibit NDMA receptor antagonism (GluN1 and more specifically GlunN2B subunits) and sigma receptor agonist (more specifically subtype 1) activity. Sigma receptors are intracellular chaperones that reside in the endoplasmic reticulum of a cell. Thus, molecules with similar activity have anti-fibrotic effects and treat IPF. IPF may present with or without cough. Previous studies of ifenprodil and IPF used a mouse bleomycin model. As mice have no cough reflex, nothing was known regarding the effect, if any, of ifenprodil on coughing. Representative sigma receptor agonists include selective serotonin reuptake inhibitors (SSRI) such as fluvoxamine, fluoxetine, excitalpram and donepezil (J. Pharmacological Sciences (2015) 127:69).

Use in Combination

In another aspect, the present invention provides a use and method of treatment or prophylaxis of a cough in a subject with one or more of Ifenprodil, Radiprodil, Traxoprodil, Rislenmdaz, Eliprodil, Ro-25-6981, and BMT-108908, EVT-101, CP101-606, MK-0657, EVT-103, and AZD 6765, in combination. In another aspect, the present invention provides a use and method of treatment or prophylaxis of a cough in a subject with one or more of Ifenprodil, Radiprodil, Traxoprodil, Rislenmdaz, Eliprodil, Ro-25-6981, and BMT-108908, EVT-101, CP101-606, MK-0657, EVT-103, and AZD 6765, in combination with one or more of Dexamethasone, pirfenidone and nintedanib.

The term "therapeutically effective amount" used herein refers to the amount of an active ingredient sufficient to confer a desired prophylactic or therapeutic effect in a treated subject. In some embodiments, the effective amount is determined, for example, based on the administration route and frequency, body weight and species of the subject receiving the pharmacologic compound.

In some embodiments, an effective amount of the pharmacologic compound is formulated with a pharmaceutically acceptable vehicle and administered to the subject. The term "pharmaceutically acceptable" used herein means that the vehicle is known in the art as compatible with the pharmacologic compound while also being safe to the subject receiving the treatment. In some embodiments, the pharmaceutically acceptable vehicle is determined by persons skilled in the art evaluating, for example, the solubility of the pharmacologic compound in said vehicle.

Embodiments of the present invention are further described with reference to the following examples, which are intended to be illustrative and not limiting in nature.

Example—Materials and Methods

The guinea pig species used in one study was twenty four Male Dunkin Hartley guinea pigs, each weighing between 300 and 350 g, which were supplied by Marshall Bioresources Ltd, UK.

The guinea pigs were housed in pens (11125 $cm^2$) on arrival with a 12 hour light/dark cycle. Room temperature and humidity were maintained within home office guidelines (17-24 C and 40-70% respectively). Environmental enrichment were also provided in all pens. The guinea pigs were given access to standard chow ad libitum. Water was also made available from bottles ad libitum. An acclimatization period of 7 days was allowed before the start of experimental procedures.

The animals were observed once daily in the morning throughout the study. During the treatment period, the animals were observed every 15-30 min. Any animals showing signs of being unwell beyond the limits of the UK home office project license, were culled and the sponsor monitor was informed.

The following guidelines (provided by the UK Home Office) were used to assess non-specific or unexpected adverse effects in the animals undergoing regulated procedures in this study. They relate to either the procedure, test compound, or control drug dosing. Animals showing two or more of any of the following limiting clinical signs in the category equivalent to the protocol severity limit were removed from the study and euthanized using a schedule 1 method (usually cervical dislocation) at the establishment. Where an animal reached the limit of either, or both, of the first two signs with or without any other signs, that animal was removed from the study and killed by a schedule 1 method at the establishment. Animals exposed to severe fight injuries were also removed from the study and killed by a schedule 1 method at the establishment.

The limiting clinical signs include:
Body weight loss greater than 20% of the highest measured individual body weight.
Food and water consumption less than 40% of normal for 3 days or anorexia (total inappetence for 72 hrs).
Marked piloerection with other signs of dehydration such as skin tenting.
Unresponsive to activity and provocation.
Hunched persistently (frozen).
Distressed-persistent vocalization.
Oculo-nasal discharge persistent and copious.
Laboured respiration.
Persistent tremors.
Persistent convulsions.

In this study, no animals were removed due to fight injuries or the above severity limits being exceeded.

A test compound, Ifenprodil, and Gefapixant (in powder form) were prepared and formulated by initially adding 100% propylene glycol at the required volume for the final treatment buffer. The additional buffer ingredients were added in a stepwise fashion, initially solutol and then captisol. Each ingredient was added in a volume equivalent to that which is required for the final volume of treatment buffer for the stock formulation.

In particular, for Gefapixant, this was 0.7 mg/mL, a concentration that delivers 3.5 mg/Kg in a dose volume of 5 mL/Kg. For Ifenprodil, this was 0.3 mg/mL, a concentration that delivers 1.5 mg/Kg in a dose volume of 5 mL/Kg.

Prior to the addition of each buffer ingredient, the test compound formulations were sonicated for 15 min using a Branson 1510 Sonicator. Afterwards, the initial formulation of the test compound and Gefapixant were diluted with a prepared buffer vehicle to provide additional dosing formulations. This was 0.01 to 0.2 mg/ml, preferably 0.06 mg/mL, a dose that delivers 0.3 mg/Kg in a dose volume of 5 mL/Kg.

The final test compound buffer vehicle comprised of 10:10:80 mix of propylene glycol:20% Solutol in PBS:5% Captisol in PBS.

The vehicle was formulated by adding 20% Solutol in PBS to 100% propylene gycol followed by adding 5% Capitisol in PBS. The final vehicle preparation was a 10:10:80 mix of propylene glycol, 20% Solutol and 5% Captisol. Thus, in every 1 mL of vehicle, there will be 0.1 mL of 100% propylene glycol, 0.1 mL of 20% Solutol and 0.8 mL of 5% Captiosol.

All final test and control formulations were sonicated for 30 min prior to dosing to generate an even suspension or to ensure that the formulation had visibly dissolved.

The animals were first pre-treated (5 mL/Kg, p.o.) with the vehicle, the test compound, or Gefapixant prior to tussive agent (citric acid) exposure, using the amounts set out in Table 1 below. In each case, the route of administration of the treatment was oral.

TABLE 1

| Group | Treatment | Dose Level | Regime | Citric Acid [1M] |
|---|---|---|---|---|
| 1 n = 6 | Vehicle | N/A | 2 hrs prior to citric acid | – |
| 2 n = 6 | Vehicle | N/A | 2 hrs prior to citric acid | + |
| 3 n = 6 | Gefapixant | 3.5 mg/Kg | 2 hrs prior to citric acid | + |
| 4 n = 6 | Ifenprodil | 1.5 mg/Kg | 30 min prior to citric acid | + |

Animals receiving Gefapixant (3.5 mg/Kg) were dosed 2 hours prior to tussive agent exposure. Animals receiving Ifenprodil (1.5 mg/Kg) were dosed 30 minutes prior to tussive agent exposure.

10 min prior to the tussive evaluation, each animal was individually placed into a purpose built exposure chamber with a supplied airflow through a nebuliser of 2 L/min, and allowed to settle into its new environment.

Following the acclimatisation period, each animal was then exposed for 10 min to an aerosol of 1M citric acid using an ultrasonic nebuliser (Aerogen) set at a nominal liquid consumption rate of 0.6 mL/min.

Coughs and sneezes elicited during the 10 minute aerosol of 1M citric acid, and a subsequent 5 minute observation period, were recorded manually to monitor the animal's welfare. This data also served to provide a back-up data set to that obtained from the airflow pressure changes that were recorded on a data acquisition system (Powerlab), which was used to ensure accurate differentiation between coughs and sneezes. The data was analysed for onset of cough, cough numbers and frequency, and sneezes.

At the end of each experiment, the animals were immediately euthanized with overdose to pentobarbitone.

The following measurements and assessments were taken for each guinea pig:
  Mean total number of coughs evoked in each treatment group
  Mean onset of first cough in each group
  Mean number of coughs per minute during citric acid exposure in each treatment group Inter-group deviations were statistically analyzed by a one-way analysis of variance (ANOVA). In the case of significant difference in the mean values among the different levels of treatment, comparisons versus the citric acid vehicle group were carried out using the Dunnett's test. $p<0.05$ was considered statistically significant.

Results

Total Number of Coughs

Figure 3:
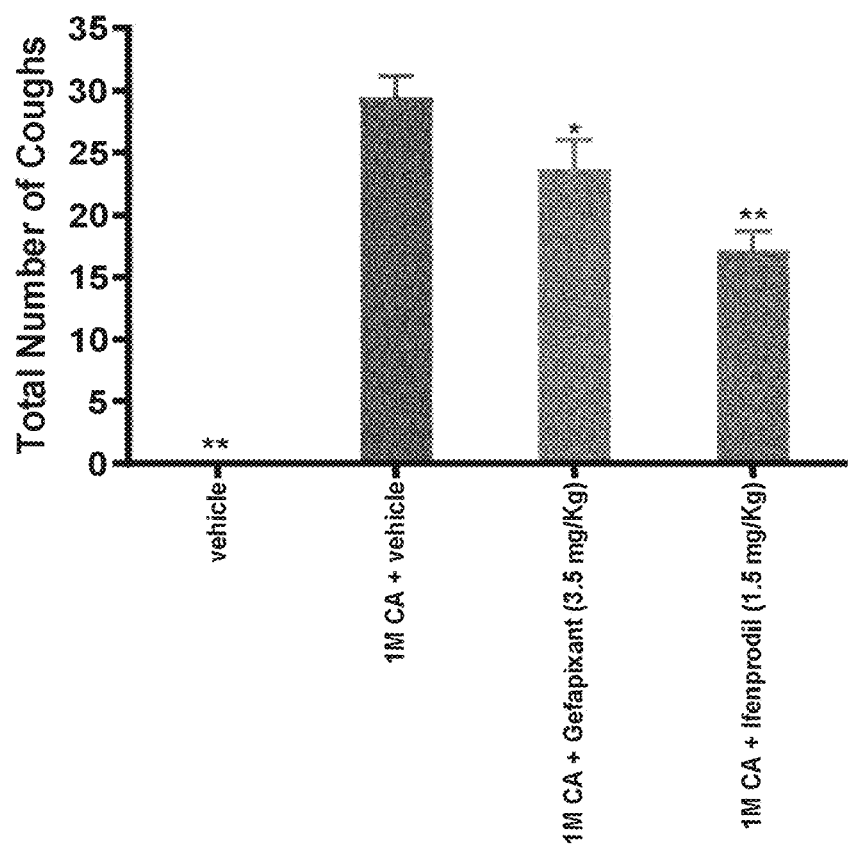
FIG. 3 is a bar graph summarizing the total number of coughs from groups of guinea pigs in a study during a 10 minute exposure and 5 minute recovery period to citric acid or saline, following treatment with Gefapixant or Ifenprodil, as compared with a vehicle group.

FIG. 3 summarizes the total number of coughs from guinea pigs during the 10 minute exposure and 5 minute recovery period to citric acid (1M) or saline, following treatment with Gefapixant (3.5 mg/Kg, p.o.) Ifenprodil (1.5 mg/Kg, p.o.) or vehicle (5 mL/Kg, p.o.).

Each column represents the mean and the vertical bars the s.e. mean (n=6 per group). Total cough numbers in test compound treated animals were compared to the vehicle control animals that received citric acid exposure (*), using ANOVA followed by Dunnett's post hoc test, where *$P<0.05$, **$P<0.01$.

The raw data is set out in Appendix A below. The vehicle group had an average of 29.5 coughs per animal. The group treated with Gefapixant had an average of 23.67 coughs per animal. Notably, the group treated with Ifenprodil had an average of 17.17 coughs per animal.

Onset of First Cough

Figure 4:
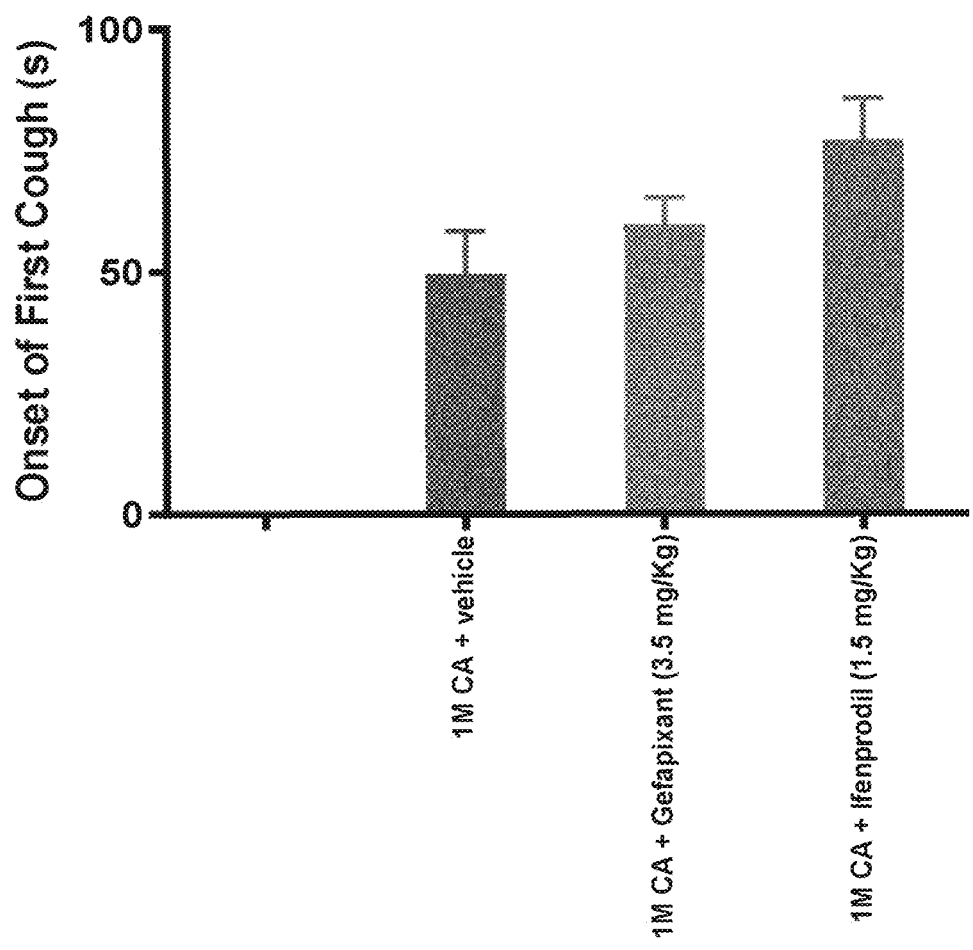
FIG. 4 is a bar graph summarizing the onset of first cough from groups of guinea pigs in a study during a 10 minute exposure and 5 minute recovery period to citric acid or saline, following treatment with Gefapixant or Ifenprodil, as compared with a vehicle group.

FIG. 4 summarizes the amount of time for the onset of first coughs from the guinea pigs during a 10 minute exposure and 5 minute recovery period to citric acid (1M) or saline, following treatment with Gefapixant (3.5 mg/Kg, p.o.) Ifenprodil (1.5 mg/Kg, p.o.) or vehicle (5 ml/Kg, p.o.).

Each column represents the mean and the vertical bars the s.e. mean (n=6 per group). Onsets of first cough in test compound treated animals were compared to the vehicle control animals that received citric acid exposure (*), using ANOVA followed by Dunnett's post hoc test.

The raw data is set out in Appendix A below. The first onset of cough in the vehicle group was 34.2 seconds. The first onset of cough in the group treated with Gefapixant was 49.7 seconds. Notably, the first onset of cough in the group treated with Ifenprodil was 59.8 seconds.

Total Number of Sneezes

The raw data is set out in Appendix B below. The vehicle group had an average of 5.17 sneezes per animal. The group treated with Gefapixant had an average of 3.17 sneezes per animal. The group treated with Ifenprodil had an average of 3.33 sneezes per animal.

CONCLUSIONS

In conclusion, oral administration of Radiprodil, and/or other glutamate 2b receptor antagonists, and especially Ifenprodil, shows efficacy in preventing and/or alleviating coughing.

In particular, Ifenprodil (1.5 mg/kg) showed a reduction of 42% in mean cough frequency vs untreated control ($p<0.01$). Gefapixant (3.5 mg/kg) showed a 20% reduction in mean cough frequency vs untreated control ($p<0.05$). Ifenprodil (59.8 seconds) and Gefapixant (49.7 seconds) both showed a delay in the onset of the first cough when compared to control (34.2 seconds).

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

APPENDIX A

Study No: 220-001

| Group | Animal ID | Weight (g) | Cough Onset (sec) | Observation Period | | | | | | | | | | | | | | | | Total Coughs |
|---|---|---|---|---|---|---|---|---|---|---|---|---|---|---|---|---|---|---|---|---|
| | | | | 0-1 | 1-2 | 2-3 | 3-4 | 4-5 | 5-6 | 6-7 | 7-8 | 8-9 | 9-10 | 10-11 | 11-12 | 12-13 | 13-14 | 14-15 | |
| 10 min saline exposure | | | | | | | | | | | | | | | | | | | | |
| vehicle i.v. | 1 | 388 | | 0 | 0 | 0 | 0 | 0 | 0 | 0 | 0 | 0 | 0 | 0 | 0 | 0 | 0 | 0 | 0 |
| | 2 | 415 | | 0 | 0 | 0 | 0 | 0 | 0 | 0 | 0 | 0 | 0 | 0 | 0 | 0 | 0 | 0 | 0 |
| | 3 | 403 | | 0 | 0 | 0 | 0 | 0 | 0 | 0 | 0 | 0 | 0 | 0 | 0 | 0 | 0 | 0 | 0 |
| | 4 | 376 | | 0 | 0 | 0 | 0 | 0 | 0 | 0 | 0 | 0 | 0 | 0 | 0 | 0 | 0 | 0 | 0 |

APPENDIX A-continued

Study No: 220-001

| Group | Animal ID | Weight (g) | Cough Onset (sec) | 0-1 | 1-2 | 2-3 | 3-4 | 4-5 | 5-6 | 6-7 | 7-8 | 8-9 | 9-10 | 10-11 | 11-12 | 12-13 | 13-14 | 14-15 | Total Coughs |
|---|---|---|---|---|---|---|---|---|---|---|---|---|---|---|---|---|---|---|---|
| | 5 | 395 | | 0 | 0 | 0 | 0 | 0 | 0 | 0 | 0 | 0 | 0 | 0 | 0 | 0 | 0 | 0 | 0 |
| | 6 | 387 | | 0 | 0 | 0 | 0 | 0 | 0 | 0 | 0 | 0 | 0 | 0 | 0 | 0 | 0 | 0 | 0 |
| | Total | | | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | |
| | Mean | 394.0 | #DIV/0! | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.00 |
| | SD | 13.7 | #DIV/0! | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.00 |
| | n | 6 | 0 | 6 | 6 | 6 | 6 | 6 | 6 | 6 | 6 | 6 | 6 | 6 | 6 | 6 | 6 | 6 | 6 |
| | SEM | 5.6 | #DIV/0! | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.00 |

10 min Citric acid (1M) exposure

| Group | Animal ID | Weight (g) | Cough Onset (sec) | 0-1 | 1-2 | 2-3 | 3-4 | 4-5 | 5-6 | 6-7 | 7-8 | 8-9 | 9-10 | 10-11 | 11-12 | 12-13 | 13-14 | 14-15 | Total Coughs |
|---|---|---|---|---|---|---|---|---|---|---|---|---|---|---|---|---|---|---|---|
| vehicle i.v. | 1 | 380 | 43 | 1 | 1 | 3 | 2 | 4 | 3 | 2 | 2 | 1 | 2 | 1 | 1 | 1 | 0 | 1 | 25 |
| | 2 | 375 | 26 | 2 | 2 | 3 | 4 | 3 | 2 | 4 | 4 | 3 | 2 | 2 | 1 | 1 | 0 | 0 | 33 |
| | 3 | 412 | 38 | 1 | 2 | 4 | 5 | 4 | 4 | 2 | 1 | 3 | 2 | 1 | 1 | 2 | 0 | 1 | 33 |
| | 4 | 404 | 23 | 2 | 2 | 3 | 4 | 4 | 3 | 4 | 3 | 2 | 2 | 0 | 2 | 0 | 0 | 1 | 32 |
| | 5 | 393 | 29 | 2 | 4 | 3 | 5 | 4 | 4 | 1 | 2 | 0 | 2 | 1 | 1 | 0 | 1 | 0 | 30 |
| | 6 | 386 | 46 | 1 | 2 | 1 | 3 | 2 | 1 | 3 | 3 | 2 | 2 | 2 | 1 | 0 | 0 | 1 | 24 |
| | Total | | | 9.0 | 13.0 | 17.0 | 23.0 | 21.0 | 17.0 | 16.0 | 15.0 | 11.0 | 12.0 | 7.0 | 7.0 | 4.0 | 1.0 | 4.0 | |
| | Mean | 391.7 | 34.2 | 1.5 | 2.2 | 2.8 | 3.8 | 3.5 | 2.8 | 2.7 | 2.5 | 1.8 | 2.0 | 1.2 | 1.2 | 0.7 | 0.2 | 0.7 | 29.50 |
| | SD | 14.2 | 9.5 | 0.5 | 1.0 | 1.0 | 1.2 | 0.8 | 1.2 | 1.2 | 1.0 | 1.2 | 0.0 | 0.8 | 0.4 | 0.8 | 0.4 | 0.5 | 4.04 |
| | n | 6 | 6 | 6 | 6 | 6 | 6 | 6 | 6 | 6 | 6 | 6 | 6 | 6 | 6 | 6 | 6 | 6 | 6 |
| | SEM | 5.8 | 3.9 | 0.2 | 0.4 | 0.4 | 0.5 | 0.3 | 0.5 | 0.5 | 0.4 | 0.5 | 0.0 | 0.3 | 0.2 | 0.3 | 0.2 | 0.2 | 1.65 |

10 min Citric acid (1M) exposure / Post Exposure (5 mins)

| Group | Animal ID | Weight (g) | Cough Onset (sec) | 0-1 | 1-2 | 2-3 | 3-4 | 4-5 | 5-6 | 6-7 | 7-8 | 8-9 | 9-10 | 10-11 | 11-12 | 12-13 | 13-14 | 14-15 | Total Coughs |
|---|---|---|---|---|---|---|---|---|---|---|---|---|---|---|---|---|---|---|---|
| Gefapixant 3.5 mg/Kg | 1 | 384 | 72 | 0 | 1 | 1 | 2 | 2 | 1 | 1 | 2 | 2 | 2 | 1 | 0 | 1 | 0 | 0 | 16 |
| | 2 | 411 | 24 | 1 | 3 | 3 | 2 | 2 | 3 | 2 | 2 | 2 | 3 | 2 | 0 | 1 | 0 | 0 | 26 |
| | 3 | 387 | 64 | 0 | 2 | 4 | 3 | 3 | 3 | 2 | 1 | 2 | 0 | 2 | 1 | 0 | 1 | 0 | 24 |
| | 4 | 393 | 36 | 1 | 3 | 3 | 2 | 3 | 2 | 2 | 1 | 3 | 1 | 1 | 1 | 0 | 0 | 0 | 23 |
| | 5 | 407 | 32 | 1 | 2 | 5 | 4 | 4 | 4 | 4 | 2 | 2 | 2 | 2 | 1 | 0 | 0 | 0 | 33 |
| | 6 | 402 | 70 | 0 | 1 | 2 | 1 | 3 | 3 | 3 | 2 | 1 | 2 | 1 | 0 | 1 | 0 | 0 | 20 |
| | Total | | | 3.0 | 12.0 | 18.0 | 14.0 | 17.0 | 16.0 | 14.0 | 10.0 | 12.0 | 10.0 | 9.0 | 3.0 | 3.0 | 1.0 | 0.0 | |
| | Mean | 397.3 | 49.7 | 0.5 | 2.0 | 3.0 | 2.3 | 2.8 | 2.7 | 2.3 | 1.7 | 2.0 | 1.7 | 1.5 | 0.5 | 0.5 | 0.2 | 0.0 | 23.67 |
| | SD | 11.0 | 21.3 | 0.5 | 0.9 | 1.4 | 1.0 | 0.8 | 1.0 | 1.0 | 0.5 | 0.6 | 1.0 | 0.5 | 0.5 | 0.5 | 0.4 | 0.0 | 5.75 |
| | n | 6 | 6 | 6 | 6 | 6 | 6 | 6 | 6 | 6 | 6 | 6 | 6 | 6 | 6 | 6 | 6 | 6 | 6 |
| | SEM | 4.5 | 8.7 | 0.2 | 0.4 | 0.6 | 0.4 | 0.3 | 0.4 | 0.4 | 0.2 | 0.3 | 0.4 | 0.2 | 0.2 | 0.2 | 0.2 | 0.0 | 2.35 |

10 min Citric acid (1M) exposure / Post Exposure (5 mins)

| Group | Animal ID | Weight (g) | Cough Onset (sec) | 0-1 | 1-2 | 2-3 | 3-4 | 4-5 | 5-6 | 6-7 | 7-8 | 8-9 | 9-10 | 10-11 | 11-12 | 12-13 | 13-14 | 14-15 | Total Coughs |
|---|---|---|---|---|---|---|---|---|---|---|---|---|---|---|---|---|---|---|---|
| Ifenprodil 1.5 mg/Kg | 1 | 389 | 65 | 0 | 1 | 3 | 3 | 3 | 2 | 1 | 1 | 0 | 1 | 0 | 1 | 0 | 0 | 0 | 16 |
| | 2 | 411 | 69 | 0 | 2 | 3 | 2 | 2 | 2 | 2 | 2 | 1 | 0 | 1 | 0 | 0 | 0 | 0 | 17 |
| | 3 | 403 | 43 | 1 | 2 | 3 | 3 | 3 | 3 | 1 | 2 | 3 | 1 | 1 | 0 | 0 | 0 | 0 | 23 |
| | 4 | 379 | 72 | 2 | 1 | 2 | 2 | 3 | 2 | 1 | 2 | 1 | 2 | 1 | 0 | 0 | 0 | 0 | 19 |
| | 5 | 388 | 43 | 1 | 2 | 3 | 1 | 3 | 3 | 0 | 2 | 1 | 0 | 0 | 0 | 0 | 0 | 0 | 16 |
| | 6 | 395 | 67 | 0 | 1 | 0 | 2 | 1 | 2 | 3 | 1 | 0 | 1 | 1 | 0 | 0 | 0 | 0 | 12 |
| | Total | | | 4.0 | 9.0 | 14.0 | 13.0 | 15.0 | 14.0 | 8.0 | 10.0 | 6.0 | 5.0 | 4.0 | 1.0 | 0.0 | 0.0 | 0.0 | |
| | Mean | 394.2 | 59.8 | 0.7 | 1.5 | 2.3 | 2.2 | 2.5 | 2.3 | 1.3 | 1.7 | 1.0 | 0.8 | 0.7 | 0.2 | 0.0 | 0.0 | 0.0 | 17.17 |
| | SD | 11.5 | 13.2 | 0.8 | 0.5 | 1.2 | 0.8 | 0.8 | 0.5 | 1.0 | 0.5 | 1.1 | 0.8 | 0.5 | 0.4 | 0.0 | 0.0 | 0.0 | 3.66 |
| | n | 6 | 6 | 6 | 6 | 6 | 6 | 6 | 6 | 6 | 6 | 6 | 6 | 6 | 6 | 6 | 6 | 6 | 6 |
| | SEM | 4.7 | 5.4 | 0.3 | 0.2 | 0.5 | 0.3 | 0.3 | 0.2 | 0.4 | 0.2 | 0.4 | 0.3 | 0.2 | 0.2 | 0.0 | 0.0 | 0.0 | 1.49 |

APPENDIX B

Study No: 220-001

| Group | Animal ID | 0-1 | 1-2 | 2-3 | 3-4 | 4-5 | 5-6 | 6-7 | 7-8 | 8-9 | 9-10 | 10-11 | 11-12 | 12-13 | 13-14 | 14-15 | Total Sneezes |
|---|---|---|---|---|---|---|---|---|---|---|---|---|---|---|---|---|---|
| \multicolumn{17}{c}{10 min vehicle exposure} | |
| vehicle p.o. | 1 | 0 | 0 | 0 | 0 | 0 | 0 | 0 | 0 | 0 | 0 | 0 | 0 | 0 | 0 | 0 | 0 |
| | 2 | 0 | 0 | 0 | 0 | 0 | 0 | 0 | 0 | 0 | 0 | 0 | 0 | 0 | 0 | 0 | 0 |
| | 3 | 0 | 0 | 0 | 0 | 0 | 0 | 0 | 0 | 0 | 0 | 0 | 0 | 0 | 0 | 0 | 0 |
| | 4 | 0 | 0 | 0 | 0 | 0 | 0 | 0 | 0 | 0 | 0 | 0 | 0 | 0 | 0 | 0 | 0 |
| | 5 | 0 | 0 | 0 | 0 | 0 | 0 | 0 | 0 | 0 | 0 | 0 | 0 | 0 | 0 | 0 | 0 |
| | 6 | 0 | 0 | 0 | 0 | 0 | 0 | 0 | 0 | 0 | 0 | 0 | 0 | 0 | 0 | 0 | 0 |
| | Total | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | |
| | Mean | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.00 |
| | SD | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.00 |
| | n | 6 | 6 | 6 | 6 | 6 | 6 | 6 | 6 | 6 | 6 | 6 | 6 | 6 | 6 | 6 | 6 |
| | SEM | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.00 |
| \multicolumn{17}{c}{10 min Citric acid (1M) exposure} | |
| vehicle p.o. | 1 | 0 | 0 | 1 | 1 | 0 | 0 | 0 | 1 | 1 | 0 | 0 | 0 | 0 | 0 | 0 | 4 |
| | 2 | 1 | 0 | 0 | 1 | 0 | 1 | 1 | 1 | 1 | 1 | 0 | 0 | 0 | 0 | 0 | 7 |
| | 3 | 0 | 0 | 1 | 2 | 0 | 0 | 1 | 0 | 1 | 1 | 0 | 0 | 0 | 0 | 0 | 6 |
| | 4 | 0 | 1 | 0 | 1 | 0 | 0 | 0 | 1 | 2 | 0 | 0 | 0 | 0 | 0 | 0 | 5 |
| | 5 | 0 | 1 | 0 | 1 | 1 | 0 | 1 | 0 | 0 | 0 | 0 | 0 | 0 | 0 | 0 | 4 |
| | 6 | 1 | 1 | 1 | 0 | 1 | 1 | 0 | 0 | 0 | 0 | 0 | 0 | 0 | 0 | 0 | 5 |
| | Total | 2.0 | 3.0 | 3.0 | 6.0 | 2.0 | 2.0 | 3.0 | 3.0 | 5.0 | 2.0 | 0.0 | 0.0 | 0.0 | 0.0 | 0.0 | |
| | Mean | 0.3 | 0.5 | 0.5 | 1.0 | 0.3 | 0.3 | 0.5 | 0.5 | 0.8 | 0.3 | 0.0 | 0.0 | 0.0 | 0.0 | 0.0 | 5.17 |
| | SD | 0.5 | 0.5 | 0.5 | 0.6 | 0.5 | 0.5 | 0.5 | 0.5 | 0.8 | 0.5 | 0.0 | 0.0 | 0.0 | 0.0 | 0.0 | 1.17 |
| | n | 6 | 6 | 6 | 6 | 6 | 6 | 6 | 6 | 6 | 6 | 6 | 6 | 6 | 6 | 6 | 6 |
| | SEM | 0.2 | 0.2 | 0.2 | 0.3 | 0.2 | 0.2 | 0.2 | 0.2 | 0.3 | 0.2 | 0.0 | 0.0 | 0.0 | 0.0 | 0.0 | 0.48 |
| \multicolumn{11}{c}{10 min Citric acid (1M) exposure} | \multicolumn{6}{c}{Post Exposure (5 mins)} | |
| Gefapixant (3.5 mg/Kg, p.o.) | 1 | 0 | 0 | 1 | 0 | 1 | 0 | 1 | 0 | 1 | 0 | 0 | 0 | 0 | 0 | 0 | 4 |
| | 2 | 0 | 0 | 0 | 1 | 0 | 1 | 0 | 0 | 1 | 0 | 0 | 0 | 0 | 0 | 0 | 3 |
| | 3 | 1 | 1 | 0 | 0 | 1 | 0 | 1 | 0 | 0 | 1 | 0 | 0 | 0 | 0 | 0 | 5 |
| | 4 | 0 | 0 | 0 | 0 | 0 | 1 | 0 | 0 | 1 | 0 | 0 | 0 | 0 | 0 | 0 | 2 |
| | 5 | 0 | 1 | 1 | 0 | 1 | 0 | 1 | 0 | 0 | 0 | 0 | 0 | 0 | 0 | 0 | 4 |
| | 6 | 0 | 0 | 0 | 0 | 0 | 1 | 0 | 0 | 0 | 0 | 0 | 0 | 0 | 0 | 0 | 1 |
| | Total | 1.0 | 2.0 | 2.0 | 1.0 | 3.0 | 3.0 | 3.0 | 0.0 | 3.0 | 1.0 | 0.0 | 0.0 | 0.0 | 0.0 | 0.0 | |
| | Mean | 0.2 | 0.3 | 0.3 | 0.2 | 0.5 | 0.5 | 0.5 | 0.0 | 0.5 | 0.2 | 0.0 | 0.0 | 0.0 | 0.0 | 0.0 | 3.17 |
| | SD | 0.4 | 0.5 | 0.5 | 0.4 | 0.5 | 0.5 | 0.5 | 0.0 | 0.5 | 0.4 | 0.0 | 0.0 | 0.0 | 0.0 | 0.0 | 1.47 |
| | n | 6 | 6 | 6 | 6 | 6 | 6 | 6 | 6 | 6 | 6 | 6 | 6 | 6 | 6 | 6 | 6 |
| | SEM | 0.2 | 0.2 | 0.2 | 0.2 | 0.2 | 0.2 | 0.2 | 0.0 | 0.2 | 0.2 | 0.0 | 0.0 | 0.0 | 0.0 | 0.0 | 0.60 |
| \multicolumn{11}{c}{10 min Citric acid (1M) exposure} | \multicolumn{6}{c}{Post Exposure (5 mins)} | |
| Ifenprodil (1.5 mg/Kg) | 1 | 0 | 1 | 0 | 1 | 0 | 1 | 1 | 0 | 0 | 0 | 0 | 0 | 0 | 0 | 0 | 4 |
| | 2 | 0 | 0 | 1 | 0 | 1 | 0 | 1 | 0 | 0 | 0 | 0 | 0 | 0 | 0 | 0 | 3 |
| | 3 | 0 | 1 | 0 | 1 | 2 | 0 | 0 | 1 | 0 | 0 | 0 | 0 | 0 | 0 | 0 | 5 |
| | 4 | 1 | 0 | 1 | 0 | 0 | 0 | 1 | 0 | 0 | 0 | 0 | 0 | 0 | 0 | 0 | 3 |
| | 5 | 0 | 1 | 0 | 0 | 0 | 1 | 0 | 1 | 0 | 0 | 0 | 0 | 0 | 0 | 0 | 3 |
| | 6 | 0 | 0 | 0 | 0 | 0 | 0 | 1 | 1 | 0 | 0 | 0 | 0 | 0 | 0 | 0 | 2 |
| | Total | 1.0 | 3.0 | 2.0 | 2.0 | 3.0 | 2.0 | 4.0 | 3.0 | 0.0 | 0.0 | 0.0 | 0.0 | 0.0 | 0.0 | 0.0 | |
| | Mean | 0.2 | 0.5 | 0.3 | 0.3 | 0.5 | 0.3 | 0.7 | 0.5 | 0.0 | 0.0 | 0.0 | 0.0 | 0.0 | 0.0 | 0.0 | 3.33 |
| | SD | 0.4 | 0.5 | 0.5 | 0.5 | 0.8 | 0.5 | 0.5 | 0.5 | 0.0 | 0.0 | 0.0 | 0.0 | 0.0 | 0.0 | 0.0 | 1.03 |
| | n | 6 | 6 | 6 | 6 | 6 | 6 | 6 | 6 | 6 | 6 | 6 | 6 | 6 | 6 | 6 | 6 |
| | SEM | 0.2 | 0.2 | 0.2 | 0.2 | 0.3 | 0.2 | 0.2 | 0.2 | 0.0 | 0.0 | 0.0 | 0.0 | 0.0 | 0.0 | 0.0 | 0.42 |

The invention claimed is:

1. A method for treating a patient suffering from chronic cough, the method comprising:
   (a) identifying the patient as eligible for treatment of the chronic cough, wherein the patient eligible for treatment experiences or has experienced:
      (1) cough symptoms lasting for at least four weeks;
      (2) cough symptoms interrupting sleep;
      (3) cough symptoms causing exhaustion;
      (4) cough symptoms causing vomiting;
      (5) cough symptoms causing light-headedness;
      (6) cough symptoms causing rib fractures; or
      (7) any combination of (1)-(6); and
   (b) administering to the patient a pharmaceutical composition comprising:
      (i) one or more pharmaceutically acceptable excipients; and
      (ii) a therapeutically effective amount of ifenprodil or a salt thereof,
   thereby alleviating one or more cough symptoms in the patient, wherein the ifenprodil specifically targets a glutamate 2B receptor.

2. The method of claim 1, wherein the ifenprodil or salt thereof is ifenprodil and the ifenprodil has the following chemical structure:

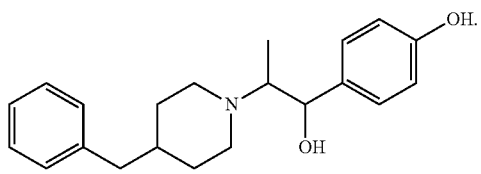 [SMILES: CC(C(O)c1ccc(O)cc1)N1CCC(Cc2ccccc2)CC1]

3. The method of claim 1, wherein the ifenprodil or salt thereof is a salt of the following chemical structure:

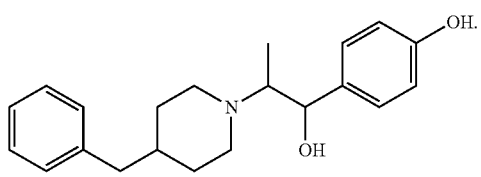 [SMILES: CC(C(O)c1ccc(O)cc1)N1CCC(Cc2ccccc2)CC1]

4. The method of claim 1, wherein the ifenprodil or salt thereof has the following chemical structure:

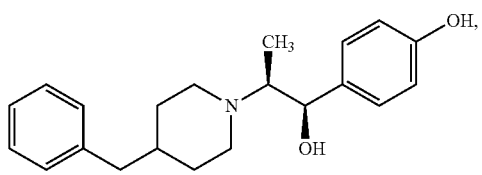 [SMILES: C[C@@H]([C@H](O)c1ccc(O)cc1)N1CCC(Cc2ccccc2)CC1]

or is a salt thereof.

5. The method of claim 1, wherein the ifenprodil or salt thereof is ifenprodil hemitartrate.

6. The method of claim 1, wherein the method comprises administering 0.1 to 5 mg of the ifenprodil or salt thereof per kg of the patient to the patient.

7. The method of claim 1, wherein the method comprises administering 0.5 to 3 mg of the ifenprodil or salt thereof per kg of the patient to the patient.

8. The method of claim 1, wherein the patient is an adult that experiences or has experienced cough symptoms lasting for eight weeks or longer.

9. The method of claim 1, wherein the patient is a child that experiences or has experienced cough symptoms lasting for four weeks or longer.

10. The method of claim 1, wherein the method comprises administering the ifenprodil or salt thereof systemically.

11. The method of claim 1, wherein the method comprises administering the ifenprodil or salt thereof orally.

12. The method of claim 1, wherein the method comprises administering the ifenprodil or salt thereof intravenously.

13. The method of claim 1, wherein the chronic cough in the patient is associated with asthma, gastroesophageal reflux disease, nonasthmatic eosinophilic bronchitis, or upper-airway cough syndrome.

14. The method of claim 1, wherein the patient experiences or has experienced the cough symptoms lasting for at least four weeks; and cough symptoms interrupting sleep, causing exhaustion, causing vomiting, causing light-headedness, causing rib fractures, or any combination thereof.

15. A method for treating a patient suffering from chronic cough, the method comprising:
   (a) identifying the patient as eligible for treatment of the chronic cough, wherein the patient eligible for treatment experiences or has experienced:
      (1) cough symptoms lasting for at least four weeks;
      (2) cough symptoms interrupting sleep;
      (3) cough symptoms causing exhaustion;
      (4) cough symptoms causing vomiting;
      (5) cough symptoms causing light-headedness;
      (6) cough symptoms causing rib fractures; or
      (7) any combination of (1)-(6); and
   (b) administering to the patient a pharmaceutical composition comprising:
      (i) one or more pharmaceutically acceptable excipients; and
      (ii) a therapeutically effective amount of ifenprodil or a salt thereof,
      thereby alleviating one or more cough symptoms in the patient,
   wherein the ifenprodil specifically targets a glutamate 2B receptor, and
   wherein the chronic cough in the patient is associated with asthma, gastroesophageal reflux disease, nonasthmatic eosinophilic bronchitis, or upper-airway cough syndrome.

16. The method of claim 15, wherein the ifenprodil or salt thereof is ifenprodil and the ifenprodil has the following chemical structure:

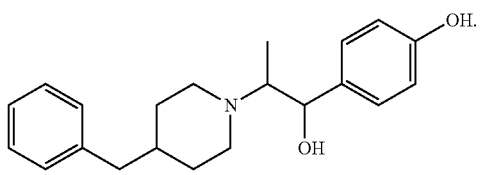 [SMILES: CC(C(O)c1ccc(O)cc1)N1CCC(Cc2ccccc2)CC1]

17. The method of claim 15, wherein the ifenprodil or salt thereof is a salt of the following chemical structure:

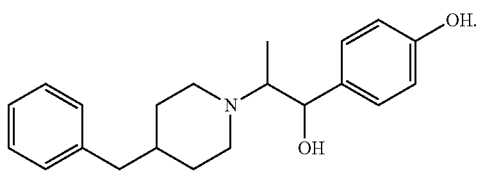 [SMILES: CC(C(O)c1ccc(O)cc1)N1CCC(Cc2ccccc2)CC1]

18. The method of claim 15, wherein the ifenprodil or salt thereof has the following chemical structure:

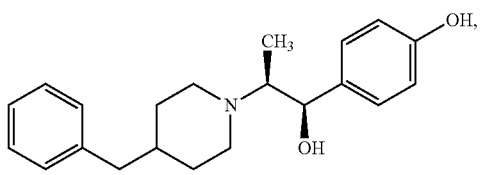 [SMILES: C[C@@H]([C@H](O)c1ccc(O)cc1)N1CCC(Cc2ccccc2)CC1]

or is a salt thereof.

19. The method of claim 15, wherein the ifenprodil or salt thereof is ifenprodil hemitartrate.

20. The method of claim 15, wherein the method comprises administering 0.1 to 5 mg of the ifenprodil or salt thereof per kg of the patient to the patient.

\* \* \* \* \*